United States Patent
Shaarpour

(10) Patent No.: US 6,861,392 B2
(45) Date of Patent: Mar. 1, 2005

(54) COMPOSITIONS FOR RESTORING LOST CIRCULATION

(75) Inventor: Mano Shaarpour, Sugar Land, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 247 days.

(21) Appl. No.: 10/107,873

(22) Filed: Mar. 26, 2002

(65) Prior Publication Data

US 2003/0186819 A1 Oct. 2, 2003

(51) Int. Cl.$^7$ .............................. C09K 7/02; C09K 7/00
(52) U.S. Cl. ...................... 507/104; 175/72; 507/112; 507/126; 507/128; 507/140; 507/204; 507/214; 507/232; 507/235; 507/269
(58) Field of Search .......................... 175/72; 507/104, 507/112, 126, 128, 140, 204, 214, 232, 235, 269

(56) References Cited

U.S. PATENT DOCUMENTS

| | | | | |
|---|---|---|---|---|
| 2,944,018 A | | 7/1960 | Borcherdt | |
| 4,217,965 A | * | 8/1980 | Cremeans | 175/72 |
| 4,289,632 A | * | 9/1981 | Clear | 507/104 |
| 4,428,844 A | * | 1/1984 | Wagener | 507/104 |
| 4,531,594 A | | 7/1985 | Cowan | 175/272 |
| 4,836,940 A | | 6/1989 | Alexander | 252/8.512 |
| 5,458,195 A | | 10/1995 | Totten et al. | 166/293 |
| 5,501,277 A | | 3/1996 | Onan et al. | 166/293 |
| 5,569,324 A | | 10/1996 | Totten et al. | 106/696 |
| 5,826,669 A | * | 10/1998 | Zaleski et al. | 175/72 |
| 6,630,429 B1 | * | 10/2003 | Cremeans et al. | 507/104 |
| 2003/0158046 A1 | * | 8/2003 | Patel et al. | 507/200 |
| 2003/0162669 A1 | * | 8/2003 | Benton et al. | 507/100 |

OTHER PUBLICATIONS

Paper entitled "Multi–Functional Solid Lubricant Reduces Friction/Prevents Mud Loss" by Jerry Alleman, dated Sep. 1998.

Baroid brochure entitled BARO–TROL® Plus Shale Stabilizer dated Feb. 2000.

Baroid brochure entitled DEXTRID® LT Filtration Control Agent dated May 1999.

Baroid brochure entitled DRILTREAT® Oil Wetting Agent dated May 1999.

Baroid brochure entitled DURATONE® HT Filtration Control Agent dated May 1999.

Baroid brochure entitled HY–SEAL® Lost Circulation Material dated May 1999.

Baroid brochure entitled LE™ SUPERMUL Emulsifier dated May 1999.

Baroid brochure entitled STEELSEAL™ Lost Circulation Additive dated May 1999.

Baroid brochure entitled Steelseal Fine™ Lost Circulation Material dated Nov. 2000.

Baroid brochure entitled SUSPENTONE™ Suspension Agent dated May 1999.

Baroid brochure entitled AQUAGEL® Viscosifier date May 1999.

Baroid brochure entitled Aquagel Gold Seal® Viscosifier dated May 1999.

Baroid brochure entitled BARACARB® Bridging Agent dated May 1999.

Baroid brochure entitled BAROFIBRE® Seepage Loss Additive dated May 1999.

Baroid brochure entitled BAROFIBRE® Superfine Seepage Loss Additive dated May 1999.

* cited by examiner

Primary Examiner—Philip C. Tucker
(74) Attorney, Agent, or Firm—Craig W. Roddy; Haynes and Boone, LLP

(57) ABSTRACT

A method and composition is provided for sealing a subterranean zone penetrated by a well bore to restore lost circulation. In one embodiment, the composition comprises a pellet comprising a mixture of lost circulation materials (LCMs).

38 Claims, No Drawings

COMPOSITIONS FOR RESTORING LOST CIRCULATION

BACKGROUND

The present embodiment relates generally to compositions and methods of utilizing the compositions for sealing a subterranean zone penetrated by a well bore to restore lost circulation.

While drilling oil and gas wells, a drilling fluid is circulated through a drill bit in a well bore and then back to the earth surface, thereby removing cuttings from the well bore. The drilling fluid is then often reconditioned and reused. In the well bore, the drilling fluid maintains a predetermined hydrostatic pressure. However, when the drill bit encounters certain unfavorable subterranean zones, the hydrostatic pressure is compromised, resulting in what is commonly known as "lost circulation." For example, lost circulation occurs when the drill bit encounters comparatively low pressure subterranean zones, such as vugs, fractures, and other thief zones. Similarly, encountering comparatively high pressure subterranean zones results in crossflows or underground blow-outs, and subsequently lost circulation.

Lost circulation requires remedial steps. Most remedial steps comprise introducing lost circulation materials ("LCMs") into the well bore to seal the above-described low pressure subterranean zones or high pressure subterranean zones. LCMs include low-cost waste products from the food processing or chemical manufacturing industries, such as ground peanut shells, mica, cellophane, walnut shells, calcium carbonate, plant fibers, cottonseed hulls, ground rubber, and polymeric materials. LCMs can be classified according to their properties, for example, there are formation bridging LCMs and seepage loss LCMs. Often, more than one LCM type must be placed down hole, based on the required LCM properties.

DESCRIPTION

A composition according to the present invention for sealing a subterranean zone penetrated by a well bore to restore lost circulation comprises an LCM pellet comprising a formation bridging component, a seepage loss component, and an oil wetting component. These terms, and the identity of compounds within each component type, are well known to those skilled in the art.

The pellet may be produced by any conventional means, such as compression, and may be of any convenient size, such as ¼" diameter. It is understood that a single pellet would not be efficacious, and so the pellets are preferably used in bulk, for example, in 40 pound sacks.

In one embodiment, the pelletized composition comprises an angular carbon compound available from Baroid, a Halliburton Company, of Houston, Tex., under the trademark "STEELSEAL™" for bridging formations having properties of torque reduction for use in oil and gas drilling fluids, a fibrous cellulose material available from Baroid, a Halliburton Company, of Houston, Tex., under the trademark "BAROFIBRE™" for preventing seepage, shredded cellulose material available from Baroid, a Halliburton Company, of Houston, Tex., under the trademark "HY-SEAL™" for preventing seepage and reducing losses in water base drilling fluids, and a lecithin liquid dispersion available from Baroid, a Halliburton Company, of Houston, Tex., under the trademark "DRILTREAT™" as an oil wetting agent.

Preferably, this embodiment of the pelletized composition comprises a pellet comprising 40% STEELSEAL angular carbon compound, 30% BAROFIBRE fibrous cellulose material, 20% HY-SEAL shredded cellulose material, and 10% DRILTREAT lecithin liquid dispersion, hereafter referred to as the "Coarse LCM Pellet Type." The Coarse LCM Pellet Type would normally be used to cure severe losses of all types of drilling fluids.

Two mixing procedures are contemplated for use, and both procedures require 30–45 minutes of soaking time. In a first procedure, 25 barrels of existing mud are added to a slugging pit, and then mixed with 1800 pounds (45 forty pound sacks) of Coarse LCM Pellet Type, and placed down hole in a conventional manner. In a second procedure, 25 barrels of fresh water are mixed with 250 pounds (5 fifty pound sacks) of sodium montmorillonite (bentonite), available from Baroid, a Halliburton Company, of Houston, Tex., under the trademark "AQUAGEL™" for use as a viscosifier, then mixed with 1800 pounds (45 forty pound sacks) of Coarse LCM Pellet Type, and placed down hole in a conventional manner.

In a second embodiment, the pelletized composition comprises an angular carbon compound available from Baroid, a Halliburton Company, of Houston, Tex., under the trademark "STEELSEAL FINE™" for bridging formations, a fibrous cellulose material available from Baroid, a Halliburton Company, of Houston, Tex., under the trademark "BAROFIBRE SUPERFINE™" for preventing seepage, graphite, calcium carbonate available from Baroid, a Halliburton Company, of Houston, Tex., under the trademark "BARACARB #5™", modified hydrocarbon powder available from Baroid, a Halliburton Company, of Houston, Tex., under the trademark "BARO-TROL™", and DRILTREAT lecithin liquid dispersion as an oil wetting agent.

Preferably, this embodiment of the pelletized composition comprises a pellet comprising 25% STEELSEAL FINE angular carbon compound, 29.5% BAROFIBRE SUPERFINE fibrous cellulose material, 5% graphite, 10% BARACARB #5 calcium carbonate, 15% BARO-TROL modified hydrocarbon, and 15.5% DRILTREAT lecithin liquid dispersion, hereafter referred to as the "Fine LCM Pellet Type." The Fine LCM Pellet Type would normally be used to cure losses in depleted zones, micro-fractured formations, and pore throat openings, and is compatible with all types of drilling fluids.

Two mixing procedures are contemplated for use, and both procedures require 30–45 minutes of soaking time. In a first procedure, 25 barrels of existing mud are added to a slugging pit, and then mixed with 2000 pounds (50 forty pound sacks) of Fine LCM Pellet Type, and placed down hole in a conventional manner. In a second procedure, 25 barrels of fresh water are mixed with 250 pounds (5 fifty pound sacks) of AQUAGEL sodium montmorillonite (bentonite) for use as a viscosifier, then mixed with 2000 pounds (50 forty pound sacks) of Fine LCM Pellet Type, and placed down hole in a conventional manner.

The following examples are illustrative of the methods and compositions discussed above.

EXAMPLE 1

A well was drilled, and a 20" drive pipe was set at 301 feet. While drilling a heavy sand section, the well developed seepage and partial losses. At a depth of 1730 feet, the well lost complete returns. Drilling was stopped and the stands were pulled, filling the backside of the well with sea water.

32 ppb Coarse LCM Pellet Type and 10 ppb BAROFIBRE fibrous cellulose material were mixed with sufficient fluid to form a 50 barrel pill. The Coarse LCM Pellet Type was observed to be easy to handle, easy to quantify, and less bulky and dusty than conventional LCMs. Moreover, the Coarse LCM Pellet Type mixed quickly and passed easily through a mixing hopper.

The pill was placed down hole, and it reestablished circulation above the lost zone at a slow pump rate. The stands were returned to the bottom of the well, and full returns were received until drilling recommenced. After 7 more feet of drilling, the well lost complete returns again. Drilling was stopped and several stands were pulled. The pill was allowed to set for 2–3 hours, and the stands were returned to the bottom of the well. Thereafter, the well was drilled to the casing point without further losses.

EXAMPLE 2

A well was drilled having a total depth of 10,230'. The casing was 7⅝" at a depth of 6,624', and the open hole was 6¾" at a depth of 10,230'. The drill string was 3½"×2.764 " ID, and the bit was 6¾" with 3-18's jets.

A lost circulation zone had been previously drilled at 9,892 feet. Conventional LCMs were used to heal the zone and return to drilling, but each time the zone was tripped through, lost circulation would return. The operators hoped to squeeze Coarse LCM Pellet Type into the lost circulation zone to prevent wiping off on trips.

25 barrels of drilling mud were mixed with 69 ppb (40 sacks) of Coarse LCM Pellet Type for 9 minutes to create a 32 barrel pill. Agitation occurred for 16 minutes, and about three quarters of the Coarse LCM Pellet Type were observed to be dissolved when pumped. After 22 minutes of agitation, all of the Coarse LCM Pellet Type were observed to be dissolved.

The pill was spotted from 9,906' to 9,126', and was observed to fall through the 18/32" jets on the drill bit with no problems. While pumping, pill total returns were lost while the pill was still in the drill pipe, as was expected. The pipe was tripped out of the hole to the casing shoe, and the calculated fill up strokes were pumped on the trip. Fluid was not observed at the well head. The pill was allowed to set for 5 hours. No squeeze was applied due to the inability of the hole to hold mud while static. Thereafter, three attempts to circulate were made at approximately one hour and two and a half hour intervals, respectively, all resulting in lost fluid (15 bbls, 10 bbls, and 10 bbls). Thirty minutes later, the hole was filled, requiring 7 bbls of fluid. Two hours later, the stands were tripped in the hole to 9906' and lost 53 bbls. An hour later, a full return was received. The Coarse LCM Pellet Type was able to cure the losses with the first pill, even though it was not squeezed into the formation due to the severity of the losses.

EXAMPLE 3

Components were mixed in the amounts listed in TABLE 1 to create mixtures comprising a standard and six batches (A–F) of Fine LCM Pellet Type. The dispersion properties were compared for the batches. The batches were in concentrations of 40 lb/bbl (Batches A–C) and 70 lb/bbl (Batches D–F). The batches were also non-weighted (Batches A&D), 14.0 lb/gal (Batches B&E), and 16.0 lb/gal (Batches C&F) formulations. Sodium montmorillonite (bentonite), available from Baroid, a Halliburton Company, of Houston, Tex., under the trademark "AQUAGEL GOLD SEAL™" was used as a viscosifier. Modified potato starch, available from Baroid, a Halliburton Company, of Houston, Tex., under the trademark "DEXTRID LT™" was used as a filtration reducer.

TABLE 1

| Components/Properties | Standard | A | B | C | D | E | F |
| --- | --- | --- | --- | --- | --- | --- | --- |
| Freshwater, bbl | 0.978 | 0.978 | 0.783 | 0.708 | 0.978 | 0.783 | 0.708 |
| AQUAGEL GOLD SEAL sodium montmorillonite, lb | 20 | 20 | 20 | 20 | 20 | 10 | 10 |
| DEXTRID LT modified potato starch, lb | 2 | 2 | 2 | 2 | 2 | 2 | 2 |
| Caustic soda, lb | 0.1 | 0.1 | 0.1 | 0.1 | 0.1 | 0.1 | 0.1 |
| Barite, lb | — | — | 303.3 | 413.3 | — | 303.3 | 413.3 |
| Fine LCM Pellet Type, lb | — | 40 | 40 | 40 | 70 | 70 | 70 |
| Time to disperse Fine LCM Pellet Type, min | — | 60 | 15 | 15 | 25 | 15 | 15 |
| Mud wt, lb/gal | — | — | 14.0 | 16.0 | — | 14.0 | 16.0 |
| API filtrate, ml | 7.2 | 4.2 | 5.6 | 5.2 | 7.0 | 12.8 | 13.0 |

The results show that the Fine LCM Pellet Type took less time to disperse when the batches contained barite. However, the Fine LCM Pellet Type successfully dispersed in all of the water-based mud samples. There was a filtration improvement between the standard and the 40 lb/bbl concentrations and the 70 lb/bbl concentrations. The 70 lb/bbl concentrations did not show as much significant difference in filtration, possibly due to the particle size distributions of the fluid.

EXAMPLE 4

Components were mixed in the amounts listed in TABLE 2 to create a synthetic or oil-based drilling fluid, available from Baroid Drilling Fluids, Houston, Tex. (PETROFREE 70/30 SWR LE BASE (12 lb/gal) comprising LE BASE™ vegetable-based ester, fresh water, GELTONE V™ viscosifier (organophilic bentonite), LE SUPERMULL™ emulsifier (tall oil fatty acid-amidoamine), lime, DURATONE HT™ filtration control (organophilic lignite), SUSPENTONE™ viscosifier (organophilic attapulgite), barite, and CaCl₂).

TABLE 2

| Components | Amount |
| --- | --- |
| LE BASE vegetable-based ester, bbl | 0.551 |
| Fresh water, bbl | 0.241 |
| GELTONE V viscosifier (organophilic bentonite), lb | 7 |
| LE SUPERMULL emulsifier (tall oil fatty acid-amidoamine), lb | 5 |
| Lime, lb | 5 |
| DURATONE HT filtration control (organophilic lignite), lb | 2 |
| SUSPENTONE viscosifier (organophilic attapulgite), lb | 1 |

TABLE 2-continued

| Components | Amount |
| --- | --- |
| Barite, lb | 228.7 |
| Calcium chloride, lb | 21.9 |
| Stirred, min | 15 |
| Rolled @ 150° F., hr | 16 |

The drilling fluid listed in TABLE 2 was used as a standard and Fine LCM Pellet Type was mixed with the drilling fluid to create a batch (A). Various properties were compared for the standard and Batch A, and the properties are listed in TABLE 3.

TABLE 3

| Properties | Standard | A |
| --- | --- | --- |
| Fine LCM Pellet Type, lb/bbl | — | 15 |
| Dispersion time, min | — | 15 |
| Temperature, ° F. | 120 | 120 |
| Plastic viscosity, cP | 20 | 23 |
| Yield point, lb/100 ft$^2$ | 20 | 24 |
| 10 Sec gel, lb/100 ft$^2$ | 10 | 12 |
| 10 Min gel, lb/100 ft$^2$ | 13 | 14 |
| Spurt on 90 µm at 200° F., ml | — | — |
| Total Filtrate | 2.0 | 2.0 |
| Spurt on 190 µm at 200° F., ml | 30 | 4.0 |
| Total Filtrate | — | 9.2 |
| Fann 35 dial readings 600 rpm | 60 | 70 |
| Fann 35 dial readings 300 rpm | 40 | 47 |
| Fann 35 dial readings 200 rpm | 33 | 38 |
| Fann 35 dial readings 100 rpm | 24 | 28 |
| Fann 35 dial readings 6 rpm | 11 | 13 |
| Fann 35 dial readings 3 rpm | 10 | 12 |

The Fine LCM Pellet Type successfully dispersed within 15 minutes of stirring on a multi-mixer and was tested for filtration control at 200° F. on both a 90 µm and 190 µm disk. There was little difference between the Batch A and the standard filtrates using the 90 µm disk, therefore a 190 µm disk was used. Batch A resulted in a 9.2 ml total filtrate loss.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention, as defined in the following claims.

What is claimed is:

1. A method of sealing a subterranean zone penetrated by a well bore to restore lost circulation comprising:
    pelletizing a composition comprising a formation bridging component, a seepage loss component, an oil wetting component, and modified hydrocarbon to form a pellet;
    contacting the pellet with a fluid to form a pill; and
    placing the pill into the subterranean zone, thereby sealing the subterranean zone and restoring lost circulation.

2. The method of claim 1 wherein the seepage loss component is a fibrous cellulose material.

3. The method of claim 1 wherein the seepage loss component is a shredded cellulose material.

4. The method of claim 1 wherein the composition comprises 40% of an angular carbon compound, 30% of a fibrous cellulose material, 20% of a shredded cellulose material, and 10% of a lecithin liquid dispersion.

5. The method of claim 1 wherein the composition comprises 25% of an angular carbon compound, 29.5% of a fibrous cellulose material, 5% graphite, 10% calcium carbonate, 15% modified hydrocarbon, and 15.5% of a lecithin liquid dispersion.

6. The method of claim 1 wherein the fluid is existing drilling mud.

7. The method of claim 1 wherein the fluid is a mixture of water and sodium montmorillonite.

8. A pellet for sealing a subterranean zone penetrated by a well bore to restore lost circulation comprising:
    a formation bridging component,
    a seepage loss component,
    an oil wetting component, and
    modified hydrocarbon.

9. The pellet of claim 8 wherein the seepage loss component is a fibrous cellulose material.

10. The pellet of claim 8 wherein the seepage loss component is a shredded cellulose material.

11. The pellet of claim 8 further comprising 40% of an angular carbon compound, 30% of a fibrous cellulose material, 20% of a shredded cellulose material, and 10% of a lecithin liquid dispersion.

12. The pellet of claim 8 further comprising 25% of an angular carbon compound, 29.5% of a fibrous cellulose material, 5% graphite, 10% calcium carbonate, 15% modified hydrocarbon, and 15.5% of a lecithin liquid dispersion.

13. A method of sealing a subterranean zone penetrated by a well bore to restore lost circulation comprising:
    pelletizing a composition comprising a formation bridging component comprising an angular carbon compound, a seepage loss component, and an oil wetting component to form a pellet;
    contacting the pellet with a fluid to form a pill; and
    placing the pill into the subterranean zone, thereby sealing the subterranean zone and restoring lost circulation.

14. The method of claim 13 wherein the seepage loss component is a fibrous cellulose material.

15. The method of claim 13 wherein the seepage loss component is a shredded cellulose material.

16. The method of claim 13 wherein the oil wetting component is a lecithin liquid dispersion.

17. The method of claim 13 wherein the composition comprises 40% of an angular carbon compound, 30% a fibrous cellulose material, 20% of a shredded cellulose material, and 10% of a lecithin liquid dispersion.

18. The method of claim 13 wherein the composition further comprises graphite.

19. The method of claim 13 wherein the composition further comprises calcium carbonate.

20. The method of claim 13 wherein the composition further compromises modified hydrocarbon.

21. The method of claim 13 wherein the composition comprises 25% of an angular carbon compound, 29.5% of a fibrous cellulose material, 5% graphite, 10% calcium carbonate, 15% modified hydrocarbon, and 15.5% of a lecithin liquid dispersion.

22. The method of claim 13 wherein the fluid is existing drilling mud.

23. The method of claim 13 wherein the fluid is a mixture of water and sodium montmorillonite.

24. A method of sealing a subterranean zone penetrated by a well bore to restore lost circulation comprising:
    pelletizing a composition comprising a formation bridging component, a seepage loss component, an oil wetting component comprising a lecithin liquid dispersion, and modified hydrocarbon to form a pellet;
    contacting the pellet with a fluid to form a pill; and placing the pill into the subterranean zone, thereby sealing the subterranean zone and restoring lost circulation.

25. A method of sealing a subterranean zone penetrated by a well bore to restore lost circulation comprising:
  pelletizing a composition comprising a formation bridging component, a seepage loss component, an oil wetting component, modified hydrocarbon, and graphite to form a pellet;
  contacting the pellet with a fluid to form a pill; and
  placing the pill into the subterranean zone, thereby sealing the subterranean zone and restoring lost circulation.

26. A method of sealing a subterranean zone penetrated by a well bore to restore lost circulation comprising:
  pelletizing a composition comprising a formation bridging component, a seepage loss component, an oil wetting component, modified hydrocarbon, and calcium carbonate to form a pellet;
  contacting the pellet with a fluid to form a pill; and
  placing the pill into the subterranean zone, thereby sealing the subterranean zone and restoring lost circulation.

27. A pellet for sealing a subterranean zone penetrated by a well bore to restore lost circulation comprising:
  a formation bridging component comprising an angular carbon compound,
  a seepage loss component, and
  an oil wetting component.

28. The pellet of claim 27 wherein the seepage lose component is a fibrous cellulose material.

29. The pellet of claim 27 wherein the seepage loss component is a shredded cellulose material.

30. The pellet of claim 27 wherein the oil wetting component is a lecithin liquid dispersion.

31. The pellet of claim 27 comprising 40% of an angular carbon compound, 30% of a fibrous cellulose material, 20% of a shredded cellulose material, and 10% of a lecithin liquid dispersion.

32. The pellet of claim 27 further comprising graphite.

33. The pellet of claim 27 further comprising calcium carbonate.

34. The pellet of claim 27 further comprising modified hydrocarbon.

35. The pellet of claim 27 comprising 25% of an angular carbon compound, 29.5% of a fibrous cellulose material, 5% graphite, 10% calcium carbonate, 15% modified hydrocarbon, and 15.5% of a lecithin liquid dispersion.

36. A pellet for sealing a subterranean zone penetrated by well bore to restore lost circulation comprising:
  a formation bridging component,
  a seepage loss component,
  an oil wetting component comprising a lecithin liquid dispersion, and
  modified hydrocarbon.

37. A pellet for sealing a subterranean zone penetrated by a well bore to restore lost circulation comprising:
  a formation bridging component,
  a seepage loss component,
  an oil wetting component,
  modified hydrocarbon, and
  graphite.

38. A pellet for sealing a subterranean zone penetrated by a well bore to restore lost circulation:
  a formation bridging component,
  a seepage loss component,
  an oil wetting component,
  modified hydrocarbon, and
  calcium carbonate.

* * * * *